(12) United States Patent
Wang et al.

(10) Patent No.: US 10,120,271 B2
(45) Date of Patent: Nov. 6, 2018

(54) LIGHT SOURCE ASSEMBLY, IMAGING DEVICE AND IMAGING METHOD

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Huan Wang, Beijing (CN); Yuting Yang, Beijing (CN); Mookeun Shin, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 472 days.

(21) Appl. No.: 14/844,116

(22) Filed: Sep. 3, 2015

(65) Prior Publication Data

US 2016/0187767 A1    Jun. 30, 2016

(30) Foreign Application Priority Data

Dec. 31, 2014  (CN) .......................... 2014 1 0850832

(51) Int. Cl.
*G03B 21/14*    (2006.01)
*H04N 9/31*     (2006.01)
(Continued)

(52) U.S. Cl.
CPC .............. *G03B 21/204* (2013.01); *F21K 2/00* (2013.01); *G03B 33/06* (2013.01); *H04N 9/3158* (2013.01); *H04N 9/3164* (2013.01)

(58) Field of Classification Search
CPC ...... H04N 9/31; H04N 9/3105; H04N 9/3111; H04N 9/3114; H04N 9/315; H04N 9/3158; G03B 21/14; G03B 21/005; G03B 21/205
See application file for complete search history.

(56) References Cited

U.S. PATENT DOCUMENTS

2007/0165189 A1    7/2007  Kawase et al.
2010/0187767 A1*   7/2010  Stahl ...................... B23K 26/38
                                                          277/500
(Continued)

FOREIGN PATENT DOCUMENTS

CN    102307305 A    1/2012
CN    102597869 A    7/2012
(Continued)

OTHER PUBLICATIONS

Second Chinese Office Action dated Jul. 15, 2016; Appln. No. 201410850832.2.
(Continued)

*Primary Examiner* — William C Dowling
(74) *Attorney, Agent, or Firm* — Ladas & Parry LLP; Loren K. Thompson

(57) ABSTRACT

A light source assembly, an imaging device and an imaging method are provided. The light source assembly comprises a light source component emitting a first light beam; a fluorescent excitation device receiving the first light beam and exciting a second light beam; a coupling device receiving an incident light beam and coupling the incident light beam into a third light beam, wherein the incident light beam includes the second light beam or includes the second light beam and the first light beam. The imaging device comprises the above-mentioned light source assembly and a projection system receiving the third light beam. The imaging method comprises: generating a first light beam; exciting a second
(Continued)

light beam by using the first light beam; coupling the second light beam into a third light beam or coupling the second light beam and the first light beam into a third light beam; and imaging with the third light beam. The light source assembly, imaging device and imaging method can represent more plentiful colors and have wider color gamut.

20 Claims, 8 Drawing Sheets

(51) Int. Cl.
    *G03B 21/20*         (2006.01)
    *F21K 2/00*          (2006.01)
    *G03B 33/06*         (2006.01)

(56) References Cited

U.S. PATENT DOCUMENTS

2011/0149167 A1     6/2011   Ferguson

2012/0188519 A1*   7/2012   Willett ................. G03B 21/204
                                              353/31
2012/0281186 A1*  11/2012   Hsiung ................. H04N 9/3129
                                              353/31
2015/0138509 A1*   5/2015   Domm ................. G03B 21/204
                                              353/31

FOREIGN PATENT DOCUMENTS

CN           102854733 A      1/2013
CN           103186024 A      7/2013
CN           103365056 A    10/2013

OTHER PUBLICATIONS

Third Chinese Office Action dated Dec. 7, 2016; Appln. No. 201410850832.2.

First Chinese Office Action Appln. No. 201410850832.2, dated Dec. 3, 2015.

\* cited by examiner

180
LIGHT SOURCE ASSEMBLY, IMAGING DEVICE AND IMAGING METHOD

TECHNICAL FIELD

Embodiments of the present invention relate to a light source assembly, an imaging device and an imaging method.

BACKGROUND

Generally, a color gamut refers to a complete set of colors which can be produced by a system and serves to represent a range of colors which can be displayed by a certain apparatus. This concept is mainly specific to various types of display apparatuses, printers and printing apparatuses. Colors that can be represented by the nature and observed by human eyes constitute a largest color space. The larger the color space of a certain apparatus is, the more the colors that can be displayed by the apparatus will be, i.e., the stronger the capacity of displaying the colors in the nature will be.

In order to visually express the concept of "color gamut", the International Commission on Illumination (CIE) prescribes a method for describing the color gamut by utilizing a CIE-xy chromaticity diagram. In the CIE-xy chromaticity diagram as illustrated in FIG. 5, the horseshoe-shaped graph represents all color types yin the nature, and the triangle-shaped graphs constituted by lines connecting blue point, green point and red point represent respective ranges of color gamut which can be displayed by various types of apparatuses; wherein the triangle-shaped graph with a larger area indicates a wider range of color gamut which can be displayed by the corresponding apparatus. At present, colors are basically displayed by using RGB as the three-primary colors; however, even under the circumstance that the lasers of RGB three colors are employed, the triangle-shaped regions of color gamut still cannot cover all the colors sensed by the human eyes. Well-known imaging devices have difficulty in fully representing all the colors in the nature due to a narrow color gamut of a light source assembly which provides the imaging device with light beams.

SUMMARY

Embodiments of the present invention provide a light source assembly, an imaging device and an imaging method, so as to achieve a relatively larger color gamut.

At least one embodiment of the present invention provides a light source assembly, comprising: a light source component configured to emit a first light beam; a fluorescent excitation device configured to receive the first light beam emitted by the light source component and excite a second light beam; a coupling device configured to receive an incident light beam and couple the incident light beam into a third light beam, wherein the incident light beam at least includes light beams of red, green and blue colors, and the incident light beam includes the second light beam; or, the fluorescent excitation device is configured to receive a portion of the first light beam, and the incident light beam includes the second light beam and the other portion of the first light beam.

For example, in the light source assembly as provided by an embodiment of the present invention, the second light beam at least includes light beams of any one color of red, green and blue.

For example, in the light source assembly as provided by an embodiment of the present invention, the first light beam excludes light beams of any one color of red, green and blue, and the second light beam includes light beams respectively having red, green and blue colors.

For example, in the light source assembly as provided by an embodiment of the present invention, the incident light beam includes the second light beam and the other portion of the first light beam; the first light beam includes light beams of any one or two colors of red, green and blue; the second light beam includes light beams of any two or one color of red, green and blue different from that of the first light beam.

For example, in the light source assembly as provided by an embodiment of the present invention, the light source component includes one light source; the light source assembly further comprises a light splitting system, wherein the light splitting system is configured to receive the first light beam emitted by the light source and transmit the first light beam to the fluorescent excitation device respectively at different times, or the light splitting system is configured to receive the first light beam emitted by the light source and transmit the first light beam to the fluorescent excitation device and the coupling device respectively at different times.

For example, in the light source assembly as provided by an embodiment of the present invention, the light splitting system comprises a reflector and a driving device driving the reflector, wherein the driving device is configured to drive the reflector to rotate, and the rotatable reflector reflects the first light beam to the fluorescent excitation device respectively at different times or reflects the first light beam to the fluorescent excitation device and the coupling device respectively at different times.

For example, in the light source assembly as provided by an embodiment of the present invention, the light source component includes a plurality of light sources which emit the first light beam respectively; the fluorescent excitation device is configured to receive the first light beam and excite the second light beam.

For example, in the light source assembly as provided by an embodiment of the present invention, the light source component includes a plurality of light sources; at least one of the plurality of light sources emits the first light beam to the fluorescent excitation device which excites the second light beam, and the other light sources emit the first light beam to the coupling device.

For example, the light source assembly as provided by an embodiment of the present invention further comprises a light shaping system; each incident light beam enters the coupling device after passing through the light shaping system; the light shaping system comprises a lens group and a homogenizing optical device which are arranged in sequence along a propagating direction of light beam.

For example, the light source assembly as provided by an embodiment of the present invention further comprises a light intensity regulating device; each incident light beam further passes through the light intensity regulating device after passing through the light shaping system and then enters the coupling device; the light intensity regulating device controls an intensity of the third light beam by regulating an intensity of each incident light beam.

For example, in the light source assembly as provided by an embodiment of the present invention, the fluorescent excitation device comprises a fluorescent powder.

For example, in the light source assembly as provided by an embodiment of the present invention, the fluorescent excitation device comprises various types of fluorescent powders at least including the fluorescent powders which excite two types of second light beams at a waveband of a same color having different wavelengths.

For example, in the light source assembly as provided by an embodiment of the present invention, the fluorescent powder is a quantum dot-fluorescent powder.

Another embodiment of the present invention provides an imaging device comprising any one of the above-mentioned light source assemblies and a projection system configured to receive the third light beam.

For example, the imaging device as provided by an embodiment of the present invention further comprises a controller connected to the light source component, wherein the controller controls the time that the light source component emits the first light beam by controlling a switching state of the light source component, so as to control a number and a type of the second light beam excited by the florescent excitation device.

For example, the imaging device as provided by an embodiment of the present invention further comprises a signal input unit, wherein the controller is connected to the signal input unit, analyzes an image signal of the signal input unit, and controls the switching state of the light source component according to the image signal.

Still another embodiment of the present invention provides an imaging method, comprising steps as below:
generating a first light beam;
exciting a second light beam by using the first light beam, wherein the first light beam excludes light beams of any one color of red, green and blue, and the second light beam includes light beams respectively having red, green and blue colors;
coupling the second light beam into a third light beam; and
imaging with the third light beam.

For example, in the imaging method as provided by an embodiment of the present invention, the step of exciting the second light beam by using the first light beam comprises: guiding the first light beam to a fluorescent excitation device and exciting the second light beam by the fluorescent excitation device.

Fox example, in the imaging method as provided by an embodiment of the present invention, the step of imaging with the third light beam comprises: guiding the third light beam to a projection system so as to image by the projection system.

Fox example, in the imaging method as provided by an embodiment of the present invention, the second light beam at a waveband of a same color having different wavelengths is excited by at least two fluorescent excitation devices different from each other.

Fox example, the imaging method as provided by an embodiment of the present invention further comprises: analyzing an image signal of the projection system, and controlling a number and a type of the second light beam excited by the fluorescent excitation device by controlling the time that the light source component emits the first light beam according to the image signal.

Another embodiment of the present invention provides an imaging method, comprising steps as below:
generating a first light beam;
exciting a second light beam by using a portion of the first light beam, wherein the first light beam includes light beams of any one or two colors of red, green and blue, and the second light beam includes light beams of any two or one color of red, green and blue different from that of the first light beam;
coupling the second light beam and the other portion of the first light beam into a third light beam; and
imaging with the third light beam.

For example, in the imaging method as provided by an embodiment of the present invention, the step of exciting the second light beam by using a portion of the first light beam comprises: guiding a portion of the first light beam to a fluorescent excitation device; and exciting a second light beam by the fluorescent excitation device.

For example, in the imaging method as provided by an embodiment of the present invention, the step of imaging with the third light beam comprises: guiding the third light beam to a projection system so as to image by the projection system.

BRIEF DESCRIPTION OF THE DRAWINGS

In order to explain the technical solution of embodiments of the present invention more clearly, accompanying drawings of the embodiments will be introduced briefly below. Obviously, the accompanying drawings in the following description only relate to some embodiments of the present invention rather than limiting the present invention.

DETAILED DESCRIPTION

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, those skilled in the art can obtain other embodiment(s), without any inventive work, which should be within the scope of the invention.

First Embodiment

Figure 1:
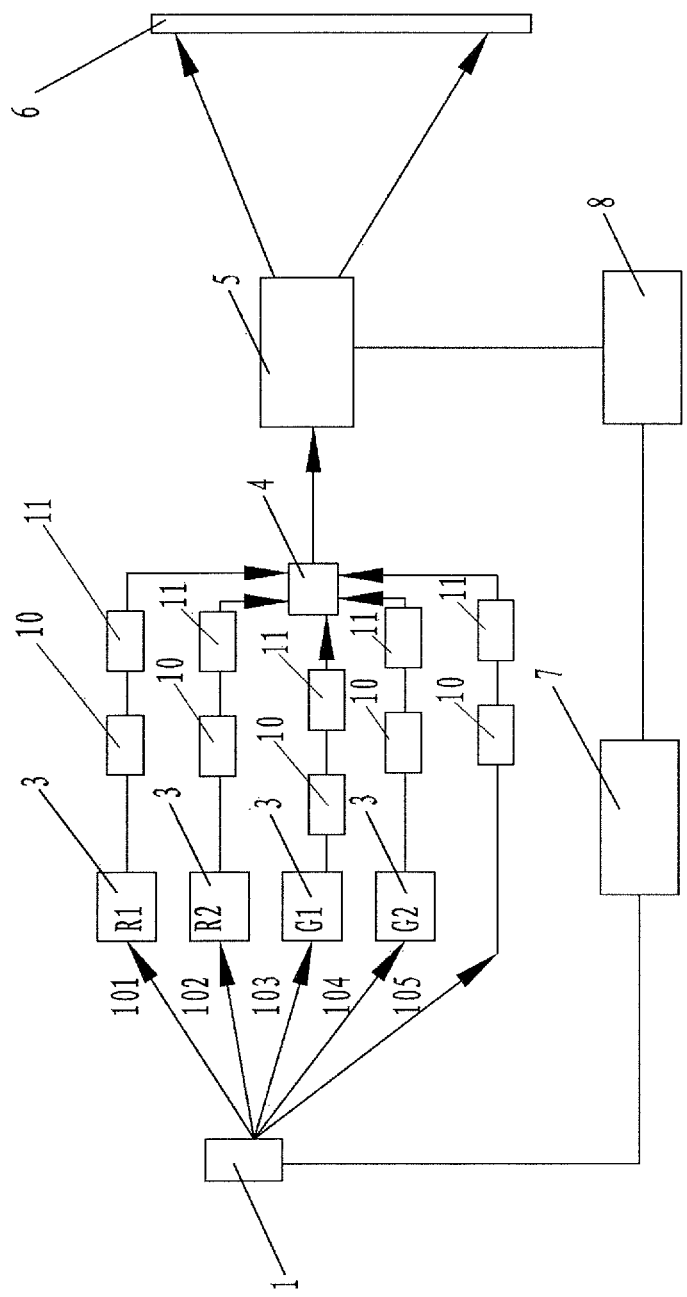
FIG. 1 is a schematically structural view of an imaging device as provided by a first embodiment of the present invention and also a light source assembly contained in the embodiment.

As illustrated in FIG. 1, a light source assembly in an embodiment of the present invention comprises: a light source component 1 configured to emit a first light beam; a fluorescence excitation device 3 configured to receive the first light beam emitted by the light source component 1 and excite a second light beam; a coupling device 4 configured to receive an incident light beam and couple the incident light beam into a third light beam, wherein the incident light beam at least comprises light beams of red, green and blue colors, and the incident light beam comprises the second light beam; or, the fluorescence excitation device 3 is configured to receive a portion of the first light beam, and the incident light beam comprises the second light beam and the other portion of the first light beam.

In the present embodiment, the fluorescence excitation device receives the first light beam emitted by the light source component and excites the second light beam which is used as the incident light beam of the coupling device, wherein the incident light beam at least comprises light beams of red, green and blue colors, and the third light beam coupled by the coupling device at least comprises light beams of three colors. Therefore, the colors contained by the third light beam is more than the well-known light source configured to provide light beam of a fixed color, which makes it possible to provide a light source with a wider color gamut for an imaging device by using the light source assembly as the light source of the imaging device.

For example, in the light source assembly as provided by an embodiment of the present invention, the second light beam at least comprises light beams of any one color of red, green and blue.

For example, in the light source assembly as provided by an embodiment of the present invention, the fluorescence excitation device 3 comprises a fluorescence powder.

For example, in the light source assembly as provided by an embodiment of the present invention, the fluorescence excitation device 3 comprises various types of fluorescence powders at least comprising the fluorescence powders which excite two types of second light beams at a waveband of a same color having different wavelengths, respectively.

The light source assembly as provided by the embodiment of the present invention contains plentiful colors and has a wider color gamut for comprising the fluorescence powders which can respectively excite light beams having different wavelengths (forming triangles at different regions of the color gamut diagram).

For example, in the light source assembly as provided by an embodiment of the present invention, the fluorescence excitation device 3 comprises various types of fluorescence powders comprising the fluorescence powders which can excite two types of second light beams of green color (i.e., G1 and G2) and the fluorescence powders which can excite two types of second light beams of red color (i.e., R1 and R2).

For example, in the light source assembly as provided by an embodiment of the present invention, the fluorescence powder is quantum dot-fluorescence powder.

The quantum dot-fluorescence powder has a single and extremely narrow emission spectrum with a Full Width at Half Maximum (FWHM) mostly below 40 nm, more preferably of 30 nm or even a dozen nanometers, which facilitates improving the color gamut. As a comparison, the conventional fluorescence powder usually has a FWHM above 60 nm.

Secondly, the quantum dot-fluorescence powder has an extremely wide excitation spectrum with an excitation wavelength which hardly influences a position of an emission peak. Due to the relatively wider excitation spectrum of the quantum dot-fluorescence powder, it's possible to arbitrarily select an excitation wavelength within a wide range of the excitation spectrum, which makes the quantum dot-fluorescence powder has a high adaptability. In case where the excitation light sources have different wavelengths, it may have a tiny deviation between the wavelengths at the emission peaks of the quantum dot. For example, in a research on the quantum dot-fluorescence powder of CdSe/ZnS dispersed within the methylbenzene, it's found that there is a deviation of 4 nm between positions of emission peaks of such quantum dot-fluorescence powder under an excitation wavelength of 300 nm and an excitation wavelength of 500 nm. Thus it can be seen that a difference in the excitation wavelength emitted by the light source component hardly influences the position of the emission peak of the quantum dot-fluorescence powder. However, a difference in the excitation wavelength can influence a luminance of the emitted light beam; that is, the shorter the excitation wavelength is, the stronger the luminance of the emitted light beam will be.

Thirdly, the quantum dot-fluorescence powder has a high light intensity which is several times or even several tens of times higher than that of conventionally used small molecule organic dye, depending on a fluorescence quantum efficiency of the quantum dot on one aspect and also a molar extinction coefficient of the quantum dot on the other aspect. In this way, a luminance of a display device can be significantly improved.

The quantum dot is consisted of chemical elements which can be mainly classified into the II-VI group and the III-V group. In order to improve the fluorescence quantum efficiency and also the stability, one of the important options is to prepare a quantum dot of core-shell type, whose basic idea is forming a wall having a large band gap at an external layer of the quantum dot, so as to constraint a non-radiative transition of electrons. A typical quantum dot of core-shell type comprises CdSe/CdS, CdSe/ZnS, CdTe/CdS and the like. A photoluminescence (PL) spectrum of the quantum dot ultimately depends on a band gap of a material of the quantum dot as well as a size of the quantum dot, thus a spectrum of the quantum dot is usually modulated during preparing the quantum dot by controlling the size of the quantum dot; in other words, given a same chemical material, quantum dots that can represent different colors are obtained by controlling the size of the quantum dot.

For example, a material of the quantum dot-fluorescent powder can be any one or two of zinc sulfide (ZnS), zinc oxide (ZnO), gallium nitride (GaN), zinc telluride (ZnTe), gallium selenide (GaSe), cadmium selenide (CdSe), indium antimonide (InSb), plumbum telluride (PdTe), zinc selenide (ZnSe), tin sulfide (SnS), cadmium sulfide (CdS), cadmium telluride(CdTe), gallium arsenide (GaAs), indium phosphide (InP), gallium antimonide (GaSb), indium arsenide (InAs), tellurium (Te), plumbum sulfide (PbS) and plumbum selenide (PbSe).

For example, the quantum dot-fluorescent powder can have a structure with a single core made of a same material like cadmium selenide (CdSe). For example, in case of cadmium selenide (CdSe), it has a diameter in a range of 2.3 nm~5.5 nm for generating the red light.

Moreover, the quantum dot-fluorescent powder can also be consisted of, for example, a core and a film layer coated on the core. A material of the core can be any one of zinc sulfide (ZnS), zinc oxide (ZnO), gallium nitride (GaN), zinc selenide (ZnSe), cadmium sulfide (CdS), zinc telluride (ZnTe), gallium selenide (GaSe), cadmium selenide (CdSe), cadmium telluride (CdTe), gallium arsenide (GaAs), indium phosphide (InP), gallium antimonide (GaSb), indium arsenide (InAs), tellurium (Te), plumbum sulfide (PbS), indium antimonide (InSb), plumbum selenide (PbSe) and plumbum telluride (PdTe); the film layer comprises any one of zinc sulfide (ZnS), zinc oxide (ZnO), gallium nitride (GaN), zinc selenide (ZnSe), cadmium sulfide (CdS), zinc telluride (ZnTe), gallium selenide (GaSe), cadmium selenide (CdSe), cadmium telluride (CdTe), gallium arsenide (GaAs), indium phosphide (InP), gallium antimonide (GaSb), indium arsenide (InAs), tellurium (Te), plumbum sulfide (PbS), indium antimonide (InSb), plumbum selenide (PbSe) and plumbum telluride (PdTe). For example, in case where it is required to generate the red light, the core is made of cadmium selenide (CdSe), while the film layer coated on the core is made of zinc sulfide (ZnS) and has a thickness in a range of 0.2 nm~1.7 nm, so that the quantum dot-fluorescent powder has a diameter in a range of 2.3 nm~5.5 nm.

The quantum dot-fluorescent powder can be prepared by a plurality of methods, including hydrothermal method, thermal colloidal method and thermal injection method, etc.

Of course, the present technical solution can also utilize fluorescent powders other than the quantum dot-fluorescent powder. For example, the fluorescent powder that can emit red light comprises: red fluorescent powder of alkaline-earth metal sulphide, red fluorescent powder of molybdate, red fluorescent powder of tungstate and the like which are excited by blue light; red fluorescent powders of molybdate and tungstate, red fluorescent powder of silicate, red fluorescent powder of zinc oxide, red fluorescent powder of vanadium phosphate and the like which are excited by ultraviolet light or near ultraviolet light. The fluorescent powder that can emit green light comprises: green fluorescent powder of silicate and the like which is excited by blue light; green fluorescent powder of silicate and green fluorescent powder of phosphate which are excited by ultraviolet light or near ultraviolet light. The fluorescent powder that can emit blue light comprises: blue fluorescent powder of aluminate, blue fluorescent powder of borate, blue fluorescent powder of chlorine borate, blue fluorescent powder of phosphate, blue fluorescent powder of chlorine silicate and the like which are excited by ultraviolet light or near ultraviolet light.

For example, the first light beam emitted by the light source component 1 in the light source assembly of the embodiment of the present invention is blue laser, which is not intended to limit the practical application thereto. The light source component 1 can also be blue LED.

During the working period of the light source assembly in the embodiment of the present invention, the light source component 1 emits the first light beam in different directions. As illustrated in FIG. 1, the first light beam is emitted in five directions, and are indicated as a first light source beam 101, a second light source beam 102, a third light source beam 103, a fourth light source beam 104 and a fifth light source beam 105. The first light source beam 101 is incident into a R1 fluorescent powder to excite a type of red light, that is, a R1 fluorescent light beam in the second light beam; and the second light source beam 102 is incident into a R2 fluorescent powder to excite another type of red light, that is, a R2 fluorescent light beam in the second light beam; the two types of red light are located at a same waveband of red light but have different wavelengths. The third light source beam 103 is incident into a G1 fluorescent powder to excite a type of green light, that is, a G1 fluorescent light beam in the second light beam; and the fourth light source beam 104 is incident into a G2 fluorescent powder to excite another type of green light, that is, a G2 fluorescent light beam in the second light beam; the two types of green light are located at a same waveband of green light but have different wavelengths. The fifth light source beam 105 is incident into the coupling device 4 directly. The coupling device 4 couples the above-mentioned fifth light source beam 105 in the first light beam and the second light beam (including the R1 fluorescent light beam, the R2 fluorescent light beam, the G1 fluorescent light beam and the G2 fluorescent light beam, in this case) into a third light beam; the third light beam is incident into a projection system 5 which projects the third light beam onto, for example, a screen 6, so as to form an image.

Figure 5:
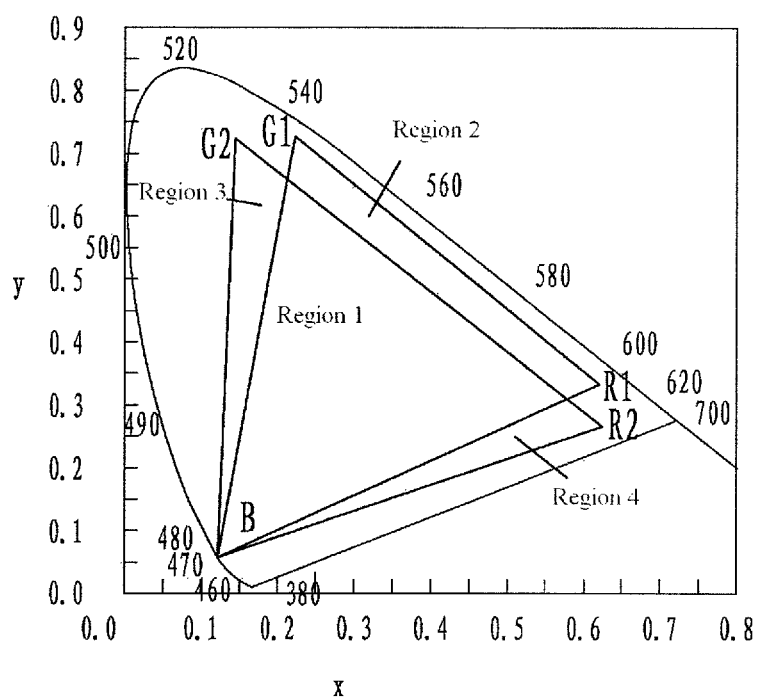
FIG. 5 is a color gamut diagram of a dynamic color gamut display realized by the light source assembly contained in the imaging device as provided by the first embodiment of the present invention.

FIG. 5 is a CIE 1931 color gamut diagram of the light source assembly in the above-mentioned embodiment of the present invention. Points B, G1 and R1 in FIG. 5 constitute a region of color gamut, which is a color region formed by the fifth light source beam 105 in the first light beam, the G1 fluorescent light beam of green color excited by the GI fluorescent powder and the R1 fluorescent light beam of red color excited by the R1 fluorescent powder (a color gamut formed by B, G1 and R1, for short); the fifth light source beam 105, the G2 fluorescent light beam of green color excited by the G2 fluorescent powder and the R2 fluorescent light beam of red color excited by the R2 fluorescent powder form another region of color gamut (a color gamut formed by B, G2 and R2, for short). A color of region 1 in the diagram can be displayed by either the color gamut formed by B, G1 and R1 or the color gamut formed by B, G2 and R2; a color of region 2 in the diagram can be displayed by the color gamut formed by B, G1 and R1; a color of region 3 and region 4 in the diagram can be displayed by the color gamut formed by B, G2 and R2.

In the light source assembly of the embodiment of the present invention, the blue light (the first light beam) excites red light with different wavelengths and green light with different wavelengths; as compared with the red light, green light and blue light having a single wavelength respectively, the light beam having a color with different wavelengths is capable of representing more plentiful colors (that is, expanding the region 2 and the region 4 or expanding the region 3 and the region 4), in other words, the assembly has a wider color gamut. These light beams emitted by the light source assembly can be coupled into the projection system through a coupling device (for example, optical fibers) and then projected onto a screen by the projection system, so as to form an image. In this way, as compared with systems having conventional light sources, the light source assembly in the embodiment of the present invention can represent more plentiful colors and has an even wider color gamut.

Figure 2:
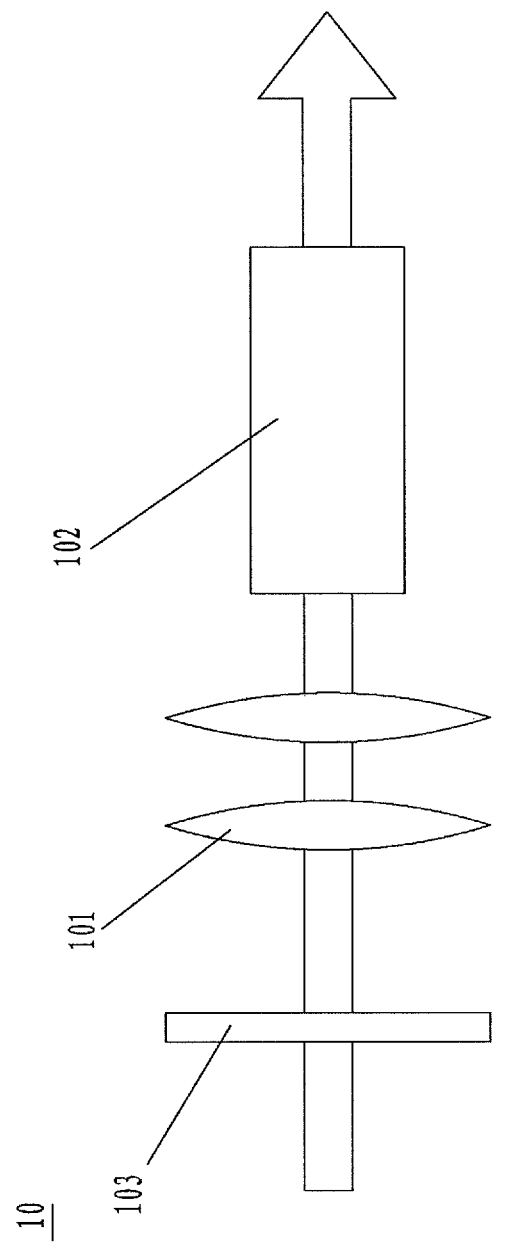
FIG. 2 is a schematically structural view of a light shaping system.

It can be seen in conjunction with FIG. 2, in order to obtain better imaging effect and to obtain light beams with more pure color, the light source assembly in the embodiment of the present invention further comprises, for example, a light shaping system 10, and each incident light beam enters into the coupling device 4 after passing through the light shaping system 10. The light shaping system 10 comprises a lens group 101 and a homogenizing optical device 102 which are arranged in sequence along a propagating direction of the light beam. Moreover, the light shaping system 10 located in an optical path of the light beams emitted by the fluorescence excitation device 3 can further comprise a filter lens 103 serving for filtering the first light beam, so as to obtain a light beam with a more pure color; that is, the above-mentioned light shaping system 10 comprises a filter lens 103, a lens group 101 and a homogenizing optical device 102 which are arranged in sequence along the propagating direction of the light beam. The homogenizing optical device 102 can be, for example, a optical tunnel.

For example, the light source assembly in the embodiment of the present invention further comprises a light intensity regulating device 11; each incident light beam further passes through the light intensity regulating device 11 after passing through the light shaping system 10, and then enters into the coupling device; the light intensity regulating device 11 controls an intensity of the third light beam output by the coupling device by regulating an intensity of each incident light beam. The light intensity regulating device 11 can be, for example, a liquid crystal panel or the like.

For example, in order to obtain better excitation efficiency, the incident light beam entering the coupling device 4 is required to comprise three-primary colors of red, green and blue which are all obtained by the excitation by means of the fluorescence excitation device 3. That is to say, in the light source assembly of the embodiment of the present invention, the first light beam excludes light beam of any one color of red, green and blue, and the second light beam includes light beams which have red, green and blue colors, respectively. For example, the light source component can be an ultraviolet source component, and in this case it is required to additionally arrange a fluorescent powder that can excite blue light in the light source assembly as illustrated in FIG. 1.

For example, in the light source assembly as provided by other embodiments of the present invention, the fluorescent excitation device is configured to receive a portion of the first light beam; the incident light beam includes the other portion of the first light beam and the second light beam; the first light beam includes light beams of any one or two colors of red, green and blue; the second light beam includes light beams of any two or one color of red, green and blue different from that of the first light beam; the light beam consisted by the first light beam and the second light beam includes light beams of three colors of red, green and blue.

As illustrated in FIG. 1, an imaging device as provided by an embodiment of the present invention comprises the above-mentioned light source assembly and a projection system 5 configured to receive the third light beam. For example, the imaging device in the present embodiment further comprises a screen 6; however, it should be explained that it's not necessary for the screen to be a portion of the imaging device but can be replaced by utilizing the projection system in the imaging device to directly project an image to be projected onto a white wall or other places onto which the image can be projected.

For example, the imaging device in the embodiment of the present invention further comprises a controller 7 connected to the light source component 1; the controller 7 controls the time that the light source component 1 emits the first light beam by controlling a switching state of the light source component 1, so as to control a number and a type of the second light beam excited by the fluorescent excitation device.

For example, the controller 7 controls a direction of the first light beam emitted by the light source component 1 by controlling the switching state of the light source component 1 (including a switching time and different orientations of the light source component under a switching-on state and a switching-off state respectively), so as to choose the number and the type of the fluorescent powder to be excited, thereby regulating the number and the type of the incident light beam of the coupling device.

For example, the imaging device in the embodiment of the present invention further comprises a signal input unit 8; the controller 7 is connected to the signal input unit 8. The signal input unit 8 can output a predetermined image signal to the projection system, so as to allow the projection system projecting according to the image signal; the signal input unit 8 can also output the image signal to the controller 7 so as to allow the controller 7 controlling the switching state of the light source component 1 according to the image signal. The controller 7 analyzes the image signal output by the signal input unit 8 and hence controls the switching state of the light source component 1 according to the image signal.

For example, a pixel of the projection system 5 is consisted of three sub-pixels of RGB (red, green and blue), and a process of realizing a display of dynamic color gamut by the imaging device as provided by embodiments of the present invention comprises steps as below.

The signal input unit 8 outputs an image signal to the controller 7, and then the controller 7 analyzes the image signal. In case where an image is required to display the colors of region 3 and region 4 but not to display the colors of region 2 in the color gamut diagram as illustrated in FIG. 5, the controller 7 controls the light source component 1, such that the second light source beam 102 of the first light beam is incident into the R2 fluorescent powder and the fourth light source beam 104 of the first light beam is incident into the G2 fluorescent powder; the coupling device 4 couples the fifth light source beam 105 of the first light beam, the R2 fluorescent light beam excited by the R2 fluorescent powder and the G2 fluorescent light beam excited by the G2 fluorescent powder into a third light beam; then the third light beam is incident into the projection system 5 to be projected onto the screen 6 by the projection system 5, so as to form an image. By parity of reasoning, in case where an image is required to display the colors of region 2 but not to display the colors of region 3 and region 4 in the color gamut diagram, the controller 7 controls the light source component 1, such that the first light source beam 101 of the first light beam is incident into the R1 fluorescent powder and the third light source beam 103 of the first light beam is incident into the G1 fluorescent powder; the coupling device 4 couples the fifth light source beam 105 of the first light beam, the R1 fluorescent light beam excited by the R1 fluorescent powder and the G1 fluorescent light beam excited by the G1 fluorescent powder into a third light beam; then the third light beam is incident into the projection system 5 to be projected onto the screen 6 by the projection system 5, so as to form an image.

In case where an image is required to display both the colors of region 2 and the colors of region 3 and region 4 in the color gamut diagram, the controller 7 is required to determine that: if an area of the image that displays the colors of region 2 is larger than an area that displays the colors of region 3 and region 4, it controls the first light source beam 101 of the first light beam to be incident into the R1 fluorescent powder, controls the third light source beam 103 of the first light beam to be incident into the G1 fluorescent powder, and controls the fifth light source beam 105 of the first light beam to be directly incident into the coupling device 4; on the contrary, if an area of the image that displays the colors of region 3 and region 4 is larger than an area that displays the colors of region 2, it controls the second light source beam 102 of the first light beam to be incident into the R2 fluorescent powder, controls the fourth light source beam 104 of the first light beam to be incident into the G2 fluorescent powder, and controls the fifth light source beam 105 of the first light beam to be directly incident into the coupling device 4. Of course, the controller 7 can also make determination according to other rules.

The projection system 5 can be a known projection imaging system. At present, the known projection imaging systems are in plurality of forms, for example, LCD-type, liquid crystal on silicon (LCOS)-type and DLP-type projection imaging systems.

The LCD-type projection imaging system is mainly consisted of a liquid crystal body, an optical system and a circuit system. A liquid crystal projector has a lamp bulb (the lamp bulb can be replaced by the light source assembly provided by the embodiment of the present invention) emitting bright white light, and the white light is split into light beams of three colors of RGB (red, green and blue) after passing through a spectroscope in the optical system. The circuit system can generate a signal controlling the liquid crystal body according to an image signal of an image source, so as to precisely control a motion of the liquid crystal body. The liquid crystal body is a substance at a state between liquid and solid, and cannot emit light itself; the projector influences a transmittance or a reflectivity of a liquid crystal unit of the liquid crystal body by means of a photoelectric effect of the liquid crystal body (that is, an alignment of liquid crystal molecules will be changed under an effect of electrical field). Three types of light beams (RGB) pass through the liquid crystal body at precise locations and then are projected onto the screen by a lens of the projector so as to form a multicolored image.

The LCOS-type projection imaging system provides an imaging method which is similar to the three-panel LCD technology, however, the light beams of a projector utilizing the LCOS technology do not pass through a LCD panel but form a colorful image by way of reflection. The LCOS technology uses a CMOS integrate circuit chip coated with LCOS as a substrate of a reflective LCD. The LCOS panel can be manufactured by steps of: forming a CMOS substrate by using a substrate smoothed with an advanced technology and coated with Al as a reflector; bonding the CMOS substrate with a glass substrate containing transparent electrodes; injecting liquid crystal into gaps between the CMOS substrate and the glass substrate and then packaging. According to the LCOS technology, a control circuit is placed behind the imaging device so as to improve the transmittance, thereby achieving increased light output and higher resolution.

A digital light processer (DLP) comprises a digital micromirror device (DMD), a light source, a color filter system, a cooling system and an illumination and projection optical lens. The light source can be replaced by the light source assembly as provided by the embodiment of the present invention. The DLP projector uses the DMD as an imaging element. A single DMD is consisted of a plurality of micromirrors each corresponding to a pixel dot, and a physical resolution of the DLP projector just depends on the number of the micromirrors. A surface of the micromirror has three states such that it deflects with an angle of 0 degree when powered off and rotates an angle of +12 degree or −12 degree (please note that in this case the mirror cannot stay at any other angles except +12 degree and −12 degree) under a control of a COMS element disposed below when powered on for reset; in the projector, these two angles correspond to a lighting state and a non-lighting state respectively. Each of the micromirrors will turn over for thousands of times every second, and the projector can generate different gray scales by adjusting a ratio of times that the micromirror statys at the two angles; in this way, a single image can be formed simply by N micromirrors. A single DLP splits the white light into red, green and blue light beams (which can be provided by the light source assembly in the embodiments of the present invention) by means of a color wheel, and the red, green and blue light beams are respectively reflected by the DMD and then arrive at the screen through an optical lens. The light beams of the three colors arrive at the screen in sequence, that is, only one color is displayed at a time. Since human eyes are unable to separate images of three colors being switched at high speed, they will observe a colorful image.

Figure 7:
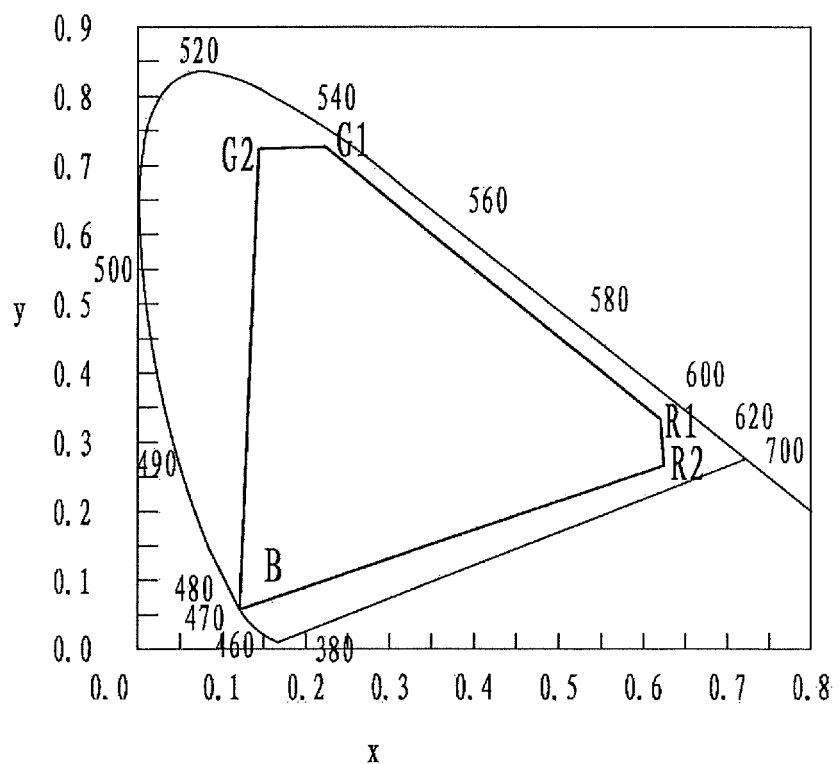
FIG. 7 is a color gamut diagram of a wide color gamut display realized by the first embodiment of the present invention.

As it can be seen in conjunction with FIG. 7, the embodiment of the present invention can also realize a display with even wider color gamut, under the premise of losing the resolution. In case where a pixel of the imaging device contains five sub-pixels which are a blue sub-pixel, a first type of green sub-pixel, a second type of green sub-pixel, a first type of red sub-pixel and a second type of red sub-pixel, the color gamut diagram as illustrated in FIG. 7 can be realized by means of a combination of the above-mentioned five sub-pixels. Such technical solution improves the color gamut in a more efficient way.

Second Embodiment

Figure 3:
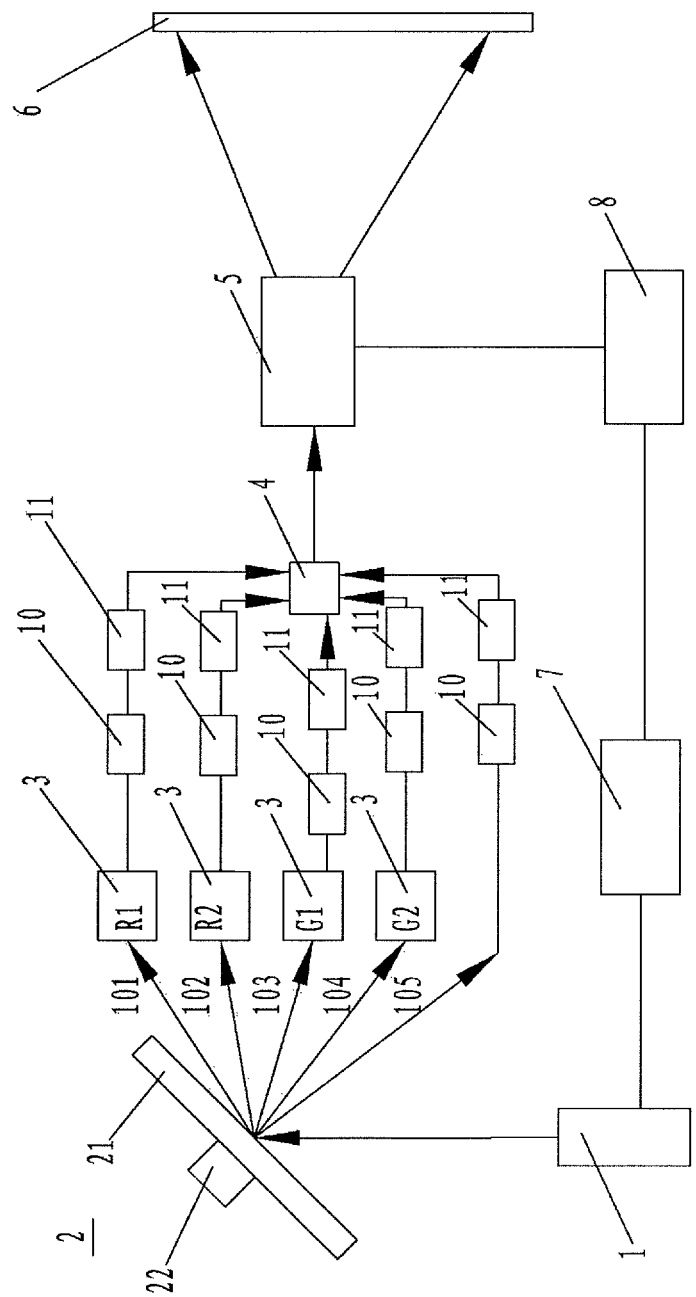
FIG. 3 is a schematically structural view of an imaging device as provided by a second embodiment of the present invention and also a light source assembly contained in the embodiment.

As it can be seen in conjunction with FIG. 3, the light source assembly of the second embodiment differs from the light source assembly of the first embodiment in that it further comprises a light splitting system 2 which is configured to receive the first light beam emitted by the light source component 1 and emit the first light beam to respective fluorescent excitation device and the coupling device at different times.

Similarly, in the light source assembly in another embodiment of the present invention, the light splitting system 2 can also be configured to receive the first light beam emitted by the light source component 1 and emit the first light beam to respective fluorescent excitation device 3 at different times.

For example, in the light source assembly in the embodiment of the present invention, the light splitting system 2 comprises a reflector 21 and a driving device 22 driving the reflector 21; the driving device 22 is configured to drive the reflector 22 to rotate, and the rotatable reflector 21 reflects the first light beam to the fluorescent excitation device respectively at different times or reflects the first light beam to the fluorescent excitation device and the coupling device respectively at different times. For example, the driving device 22 can be a motor or the like.

During an operation of the light source assembly in the embodiment of the present invention, the first light beam emitted by the light source component 1 is incident onto the reflector 21 of the light splitting system 2, and the reflector 21 reflects the first light beam to different directions at different times. The first light source beam 101 of the first light beam is reflected into the R1 fluorescent powder which excites a type of red light, that is, the R1 fluorescent light beam of the second light beam; the second light source beam 102 of the first light beam is reflected into the R2 fluorescent powder which excites another type of red light, that is, the R2 fluorescent light beam of the second light beam; the two types of red light have different wavelengths. The third light source beam 103 of the first light beam is reflected into the G1 fluorescent powder which excites a type of green light, that is, the G1 fluorescent light beam of the second light beam; the fourth light source beam 104 of the first light beam is reflected into the G2 fluorescent powder which excites another type of green light, that is, the G2 fluorescent light beam of the second light beam; the two types of green light have different wavelengths. The fifth light source beam 105 of the first light beam is directly incident into the coupling device 4. The coupling device 4 couples the fifth light source beam 105 of the first light beam and the above-mentioned second light beam into a third light beam; the third light beam is incident into the projection system 5 and is projected onto the screen 6 by the projection system 5 to form an image.

The rotatable reflector 21 facilitates a controlling operation of the controller 7 of the imaging device (as illustrated in FIG. 3) as provided by the present embodiment. The controller 7 is connected to the light source component 1, and conveniently controls the number and the type of the second light beam excited by the florescent excitation device (for example, florescent powder) by simply controlling the time that the light source component 1 emits the first light beam through controlling a switching state of the light source component 1, given that both the rotational angle and rotational speed of the reflector 21 are known.

By means of the cooperation between the switching state of the light source component 1 and the rotation of the reflector 21, the light beam emitted by the light source component 1 can be incident onto corresponding fluorescent powder; in this way, the number and the type of the fluorescent powder can be chosen, so as to adjust the number and the type of the incident light beam of the coupling device.

Third Embodiment

Figure 4:
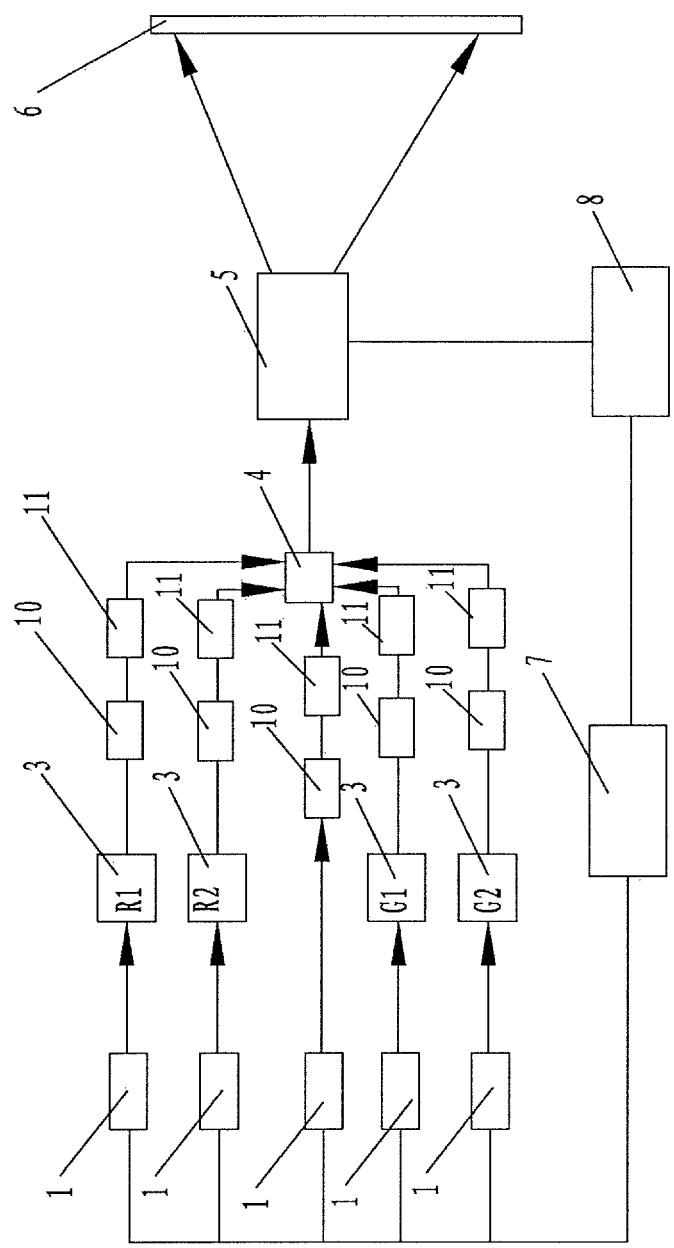
FIG. 4 is a schematically structural view of an imaging device as provided by a third embodiment of the present invention and also a light source assembly contained in the embodiment.

As it can be seen in conjunction with FIG. 4, in the light source assembly in the embodiment of the present invention, the light source component comprises a plurality of light sources 1 which emit the first light beam respectively; and the fluorescent excitation device 3 receives the above-mentioned first light beam and excites the second light beam.

Similarly to the present embodiment, in the light source assembly of another embodiment of the present invention, the light source component comprises a plurality of light sources 1; at least one of the plurality of light sources 1 emits the first light beam to the fluorescent excitation device which excites the second light beam, and the other light sources emit the first light beam to the coupling device.

Fourth Embodiment

In the present embodiment, given that the number of the light sources is not limited, the light source assembly comprises, for example, eight fluorescent excitation devices 3 which are fluorescent powders that can excite four types of green light (e.g., the fluorescent powder GI that can excite a first type of green light, the fluorescent powder G2 that can excite a second type of green light, the fluorescent powder G3 that can excite a third type of green light, and the fluorescent powder G4 that can excite a fourth type of green light; these four types of green light have different wavelengths) and fluorescent powders that can excite four types of red light (e.g., the fluorescent powder R1 that can excite a first type of red light, the fluorescent powder R2 that can excite a second type of red light, the fluorescent powder R3 that can excite a third type of red light, and the fluorescent powder R4 that can excite a fourth type of red light; these four types of red light have different wavelengths).

Figure 6:
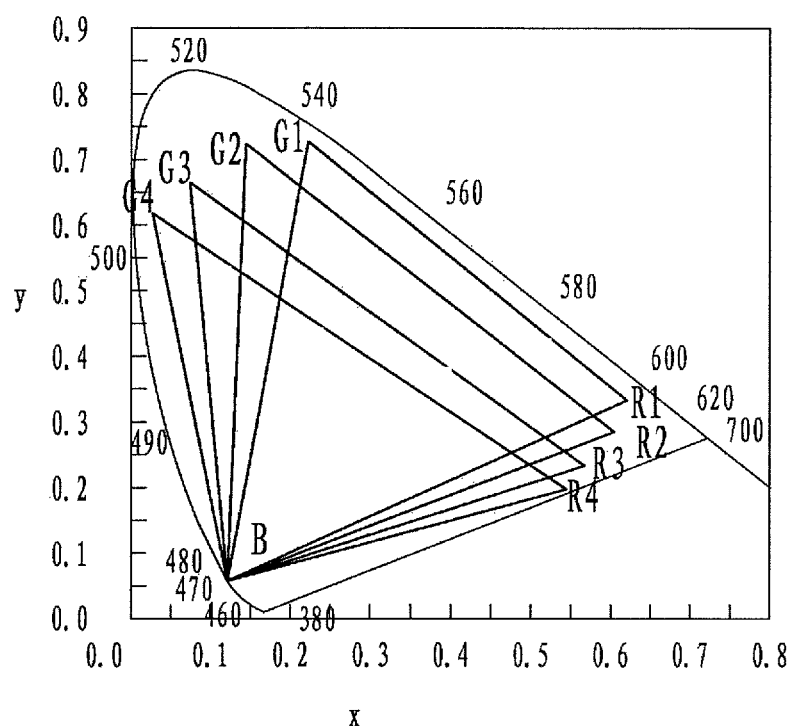
FIG. 6 is a color gamut diagram of a dynamic color gamut display realized by the light source assembly contained in the imaging device as provided by the fourth embodiment of the present invention.

FIG. 6 illustrates a CIE 1931 color gamut diagram of the light source assembly of the embodiment of the present invention; in FIG. 6, points B, G1, R1, points B, G2, R2, points B, G3, R3, and points B, G4, R4 form four regions of color gamut, respectively.

In the light source assembly of the embodiment of the present invention, the blue light (the first light beam) excites various types of red light having different wavelengths and various types of green light having different wavelengths, so as to represent more plentiful colors with the light beam of a color having multiple wavelengths. In the imaging device including the light source assembly of the present invention and a projection system, these light beams of the light source assembly can be coupled into the projection system by means of a coupling device (e.g., optical fibers) and transmitted onto the screen by the projection system to form an image. Therefore, the imaging device can also represent more plentiful colors and has a wider color gamut.

Figure 8:
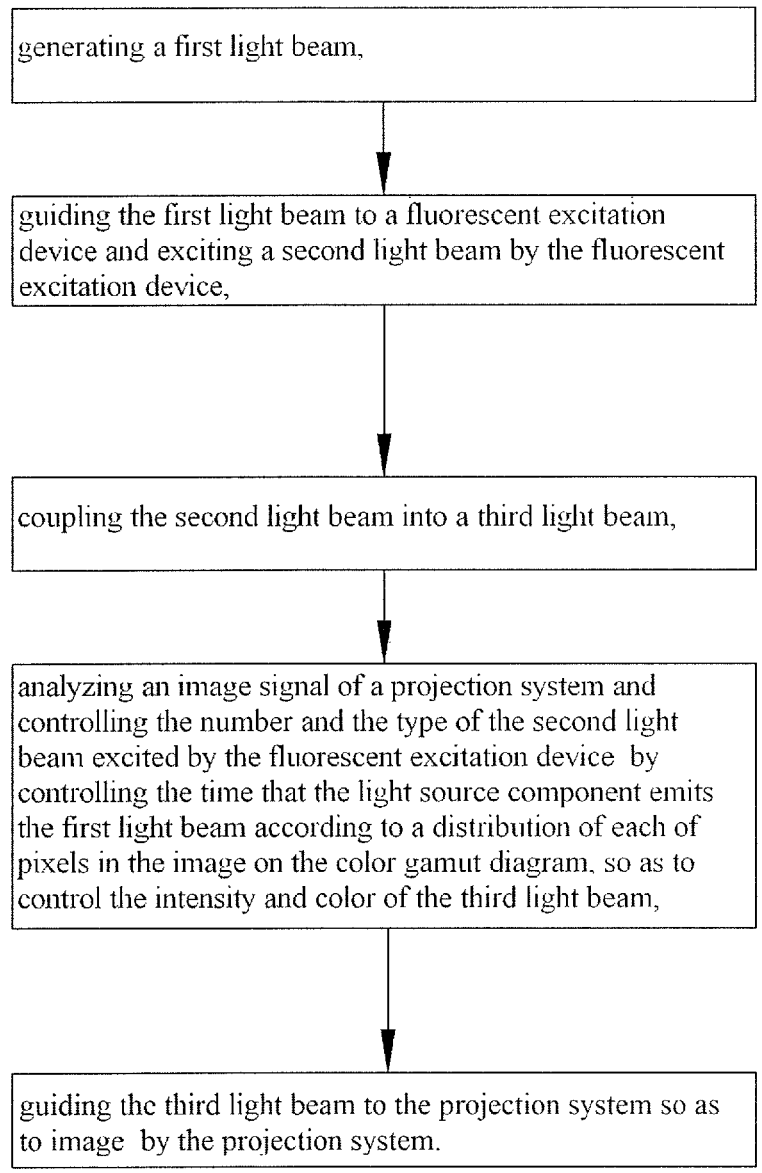
FIG. 8 is a flow chart illustrating an imaging method as provided by an embodiment of the present invention.

As illustrated in FIG. 8, another embodiment of the present invention provides an imaging method, comprising steps as below:

generating a first light beam;

exciting a second light beam by using the first light beam, wherein the first light beam excludes light beam of any one color of red, green and blue, and the second light beam includes light beams respectively having red, green and blue colors;

coupling the second light beam into a third light beam; and imaging with the third light beam.

For example, in the imaging method of the embodiment of the present invention, the step of exciting a second light beam by using the first light beam comprises: guiding the first light beam to a fluorescent excitation device and exciting the second light beam by the fluorescent excitation device.

For example, in the imaging method of the embodiment of the present invention, the step of imaging with the third light beam comprises: guiding the third light beam to a projection system and imaging by the projection system.

For example, the second light beam at a waveband of a same color having different wavelengths is excited by at least two fluorescent excitation devices different from each other.

For example, the imaging method of the embodiment of the present invention further comprises: analyzing an image signal of the projection system, and controlling the number and the type of the second light beam excited by the fluorescent excitation device (e.g., fluorescent powder) by controlling the time that the light source component emits the first light beam according to the image signal.

For example, particularly, the imaging device in an embodiment of the present invention comprises: analyzing the image signal of the projection system; and controlling the number and the type of the second light beam excited by the fluorescent excitation device (e.g., fluorescent powder) by controlling the time that the light source component emits the first light beam according to a distribution of each of pixels in the image on the color gamut diagram.

The imaging device of another embodiment of the present invention comprises steps as below:

generating a first light beam;

exciting a second light beam by using a portion of the first light beam, wherein the first light beam includes light beams of any one or two colors of red, green and blue, the second light beam includes light beams of any two or one color of red, green and blue different from that of the first light beam;

coupling the second light beam and the other portion of the first light beam into a third light beam; and imaging with the third light beam.

For example, in the imaging device of the embodiment of the present invention, the step of exciting the second light beam by using a portion of the first light beam comprises:

guiding a portion of the first light beam to a fluorescent excitation device; and exciting a second light beam by the fluorescent excitation device.

For example, in the imaging device of the embodiment of the present invention, the step of imaging with the third light beam comprises: guiding the third light beam to a projection system; and imaging by the projection system.

For example, in the imaging device of another embodiment of the present invention, the second light beam at a waveband of a same color having different wavelengths is excited by at least two fluorescent excitation devices different from each other.

For example, the imaging device of another embodiment of the present invention further comprises: analyzing an image signal of the projection system; and controlling the number and the type of the second light beam excited by the fluorescent excitation device (e.g., fluorescent powder) by controlling the time that the light source component emits the first light beam according to the image signal.

For example, particularly, the imaging method in another embodiment of the present invention comprises: analyzing the image signal of the projection system; and controlling the number and the type of the second light beam excited by the fluorescent excitation device (e.g., fluorescent powder) by controlling the time that the light source component emits the first light beam according to a distribution of each of pixels in the image on the color gamut diagram.

Therefore, the light source assembly, the imaging device and the imaging method as provided by embodiments of the present invention can represent more plentiful colors and achieve a wider color gamut.

The above implementations only serve to explain the present invention rather than limit the present invention. Those of ordinary skill in the art can make various modifications and variations without departing from the spirit and scope of the present invention. Therefore all equivalent technical proposals belong to the scope of the present invention and the scope of patent protection of the present invention should be defined by the claims.

The present application claims the priority of China patent application No. 201410850832.2 filed on Dec. 31, 2014, which is incorporated in its entirety herein by reference as part of the present application.

What is claimed is:

1. A light source assembly, comprising:
a light source component configured to emit a plurality of first light beams;
a plurality of fluorescent excitation devices configured to receive at least portion of the first light beams emitted by the light source component and excite a plurality of second light beams, respectively;
a coupling device configured to receive a plurality of incident light beams and couple the incident light beams into a third light beam,
wherein the incident light beams at least comprise light beams of red, green and blue colors, and the second light beams are at least portion of the light beams of red, green and blue colors.

2. The light source assembly of claim 1, wherein the second light beams at least comprise any one color of red, green and blue.

3. The light source assembly of claim 2, wherein the first light beams exclude any one color of red, green and blue, and the second light beams include red, green and blue colors.

4. The light source assembly of claim 2, wherein the fluorescent excitation devices are configured to receive a portion of the first light beams, the incident light beams consist of the second light beams and other portion of the first light beams; the first light beams comprise any one or two colors of red, green and blue; the second light beams comprise any two or one color of red, green and blue but different from the first light beams.

5. The light source assembly of claim 2, wherein the light source component comprises one light source; the light source assembly further comprises a light splitting system, wherein the light splitting system is configured to receive the first light beams emitted by the light source and transmit the first light beams to the fluorescent excitation device at different times, or the light splitting system is configured to receive the first light beams emitted by the light source and transmit the first light beams to the fluorescent excitation devices and the coupling device at different times.

6. The light source assembly of claim 5, wherein the light splitting system comprises a reflector and a driving device driving the reflector, the driving device is configured to drive the reflector to rotate, and the rotatable reflector reflects the first light beams to the fluorescent excitation devices respectively at different times or reflects the first light beams to the fluorescent excitation devices and the coupling device respectively at different times.

7. The light source assembly of claim 3, wherein the light source component comprises a plurality of light sources which emit the first light beams respectively; the fluorescent excitation devices are configured to receive the first light beams and excite the second light beams.

8. The light source assembly of claim 3, wherein the light source component comprises a plurality of light sources; at least one of the plurality of light sources is configured to emit the at least portion of the first light beams to the fluorescent excitation devices which excite the second light beams, and other light sources emit other portion of the first light beams to the coupling device.

9. The light source assembly of claim 1, further comprising a light shaping system, wherein each of the incident light beams enters the coupling device after passing through the light shaping system; the light shaping system comprises a lens group and a homogenizing optical device which are arranged in sequence along a propagating direction of light beam.

10. The light source assembly of claim 9, further comprising a light intensity regulating device, wherein each of the incident light beams further passes through the light intensity regulating device after passing through the light shaping system and then enters the coupling device; the light intensity regulating device controls an intensity of the third light beam by regulating an intensity of each of the incident light beams.

11. The light source assembly of claim 1, wherein the fluorescent excitation devices comprise fluorescent powders.

12. The light source assembly of claim 1, wherein the fluorescent excitation devices comprises various types of fluorescent powders at least comprising the fluorescent powders which excite two types of second light beams of a same color having different wavelengths.

13. The light source assembly of claim 11, wherein the fluorescent powders are quantum dot-fluorescent powders.

14. An imaging device, comprising a light source assembly of claim 1 and a projection system configured to receive the third light beam.

15. The imaging device of claim 14, further comprising a controller connected to the light source component, wherein the controller is configured to control a time that the light source component emits the first light beams by controlling a switching state of the light source component, so as to control a number and a type of the second light beams excited by the florescent excitation devices.

16. The imaging device of claim 15, further comprising a signal input unit, wherein the controller is connected to the signal input unit and is configured to analyze an image signal of the signal input unit and control the switching state of the light source component according to the image signal.

17. An imaging method, comprising:
generating a plurality of first light beams;
exciting a plurality of second light beams by using the first light beams, wherein the first light beams exclude light beams of any one color of red, green and blue, and the second light beams include light beams respectively having red, green and blue colors;
coupling the second light beams into a third light beam; and
imaging with the third light beam.

18. The imaging method of claim 17,
wherein exciting the second light beams by using the first light beams comprises:
guiding the first light beams to a fluorescent excitation device and exciting the second light beams by fluorescent excitation devices; wherein the second light beams of a same color having different wavelengths are excited by at least two of the fluorescent excitation devices different from each other.

19. The imaging method of claim 18, wherein imaging with the third light beam comprises:
guiding the third light beam to a projection system so as to image by the projection system; the imaging method further comprises: analyzing an image signal of the projection system, and controlling a number and a type of the second light beams excited by the fluorescent excitation device by controlling a time that the light source component emits the first light beams according to the image signal.

20. An imaging method, comprising:
generating a plurality of first light beams;
exciting a plurality of second light beams by using a portion of the first light beams, wherein the first light beams comprise light beams of any one or two colors of red, green and blue, and the second light beams comprise light beams of any two or one color of red, green and blue different from that of the first light beams;
coupling the second light beams and other portion of the first light beams into a third light beam; and
imaging with the third light beam.

* * * * *